(12) United States Patent
Niggemann et al.

(10) Patent No.: US 6,182,435 B1
(45) Date of Patent: Feb. 6, 2001

(54) THERMAL AND ENERGY MANAGEMENT METHOD AND APPARATUS FOR AN AIRCRAFT

(75) Inventors: Richard E. Niggemann; Dam Nguyen, both of Rockford, IL (US)

(73) Assignee: Hamilton Sundstrand Corporation, Windsor Locks, CT (US)

(*) Notice: Under 35 U.S.C. 154(b), the term of this patent shall be extended for 0 days.

(21) Appl. No.: 08/868,864

(22) Filed: Jun. 5, 1997

(51) Int. Cl.[7] .................................................... F02C 3/00
(52) U.S. Cl. ........................... 60/39.02; 60/730; 60/266; 60/267; 60/39.07
(58) Field of Search ............................... 60/39.02, 39.07, 60/730, 736, 266, 267; 62/238.6

(56) References Cited

U.S. PATENT DOCUMENTS

| | | | |
|---|---|---|---|
| 2,483,045 | * 9/1949 | Harby | 60/267 |
| 2,979,293 | * 4/1961 | Mount | 60/736 |
| 3,705,496 | * 12/1972 | Wolf et al. | 60/267 |
| 4,273,304 | * 6/1981 | Frosch et al. | 60/267 |
| 4,434,613 | 3/1984 | Stahl . | |
| 4,474,001 | * 10/1984 | Griffin et al. | 60/267 |
| 4,494,372 | 1/1985 | Cronin . | |
| 4,503,666 | 3/1985 | Christoff . | |
| 4,505,124 | * 3/1985 | Mayer | 60/736 |
| 4,684,081 | 8/1987 | Cronin . | |
| 4,696,156 | * 9/1987 | Burr et al. | 60/736 |
| 4,991,394 | 2/1991 | Wright . | |
| 5,241,814 | * 9/1993 | Butler | 60/736 |
| 5,272,870 | * 12/1993 | Grieb et al. | 60/736 |
| 5,414,992 | 5/1995 | Glickstein . | |
| 5,575,159 | * 11/1996 | Dittell | 62/238.6 |

OTHER PUBLICATIONS

Roth, G.L et al., "How to use fuel as a heat sink," Space Aeronautics, pp. 56–60, Mar. 1960.*

* cited by examiner

*Primary Examiner*—Ted Kim
(74) *Attorney, Agent, or Firm*—Wood, Phillips, VanSanten, Clark & Mortimer

(57) ABSTRACT

The cooling of components (26) of a vehicle (10) carrying a turbine engine (12) and a fuel supply (24) for the engine (12) without the excessive consumption of bleed air is achieved in an apparatus which includes a fuel recirculating system (34), a first heat exchanger (60) for rejecting heat from selected components (26) of the vehicle (10) to fuel flowing through the fuel recirculating system (34), and a cooling device (32) including a second heat exchanger (100, 202) for rejecting heat from the fuel to the cooling device (32) as the fuel flows through the fuel recirculating system (34).

11 Claims, 5 Drawing Sheets

THERMAL AND ENERGY MANAGEMENT METHOD AND APPARATUS FOR AN AIRCRAFT

FIELD OF THE INVENTION

This invention generally relates to the art of thermal and energy management systems for vehicles and, more particularly, to a system for cooling the components of an aircraft utilizing a turbofan as a main engine.

BACKGROUND OF THE INVENTION

The thermal management of advanced aircraft is becoming increasingly more difficult because of the rising heat loads associated with advanced avionic systems and increased aircraft speeds and capabilities. This is especially true for advanced fighter aircraft that utilize radar systems which generate a relatively high heat load and which need to be cooled to approximately 30° C. for reliability and life cycle cost considerations.

Conventionally, a combination of ram air cooling and the cooling capacity of the fuel flow to the main engines of the aircraft has been utilized to effect the thermal management of these heat loads. Under most operating conditions, the cooling capacity of the fuel delivered from the fuel tank to the combustors of the aircraft main engines is insufficient to absorb the total heat load of the aircraft. This results in an excess heat load that is absorbed by the ram air cooling. However, the ducting for the ram air cooling circuits takes up substantial aircraft volume, thereby decreasing the volume available for fuel and necessitating a larger/heavier aircraft to achieve a desired range for the aircraft. Additionally, there is a significant drag penalty associated with directing the ram air through the ram air scoop and ducting.

It is known to absorb the excess heat with an air cycle cooling system, rather than with ram air cooling. Examples of such systems are the Thermal and Energy Management Module (TEMM) (developed by a team of McDonnell Douglas, Pratt & Whitney, and Allied Signal) and the Integrated Power Package (IPP) (developed by Lockheed Martin). These systems integrate the functions of the environmental control system (ECS), the auxiliary power unit (APU), and the emergency power unit (EPU) into one rotating machine and associated valves and heat exchangers. The rotating machine is essentially a cooling turbine combined with a multi-mode gas turbine engine with a generator output for ground and emergency operation. To provide the cooling function for removing the excess heat load, bleed air from the compressor section of the main engine is used to drive the power turbine of the gas turbine engine which in turn drives the compressor of the gas turbine engine. The compressor provides a compressed air flow to a heat exchanger provided in the fan bypass duct of the main engine. The compressed air flow is cooled in the heat exchanger and then delivered to the cooling turbine which expands the air flow to provide a cold air flow for cooling the aircraft cabin and other components of the aircraft.

By integrating several formerly separate subsystems and eliminating the use of ram air cooling and its associated ducting, the TEMM and IPP systems allow for a lower weight, cost and volume package for an aircraft in comparison to conventional aircraft having non-integrated subsystems and significant ram air cooling. However, because the TEMM and the IPP systems divert a significant amount of bleed air from the compressor section of the main engine to drive the power turbine of the gas turbine engine, these systems consume much higher amounts of bleed air in comparison to conventional systems and can potentially have an adverse impact on conventional engines and the range of the aircraft. For example, the withdrawal of approximately 200 lbs. per minute of bleed air during a high altitude (approximately 50,000 feet) cruise at approximately mach=0.9 corresponds to approximately 900 horsepower of work from the main engine turbines. This requires higher fuel flows and turbine inlet temperatures in order to compensate for the lost air flow through the turbines because they must produce the 900 horsepower without the benefit of expanding the diverted bleed air flow through the turbine stages. This requirement for more fuel to accomplish any given mission undesirable increases the aircraft's takeoff gross weight.

It is also known to employ a vapor cycle cooling system to provide cooling for the radar avionics of the aircraft. This system is utilized on the F22 fighter aircraft wherein a polyalphaolefin coolant, commonly referred to as PAO coolant, flows from the radar avionics to an evaporator of a vapor cycle system where the coolant is cooled and then recirculated to the radar avionics. The compressor of the vapor cycle system is driven by an electric motor and the condenser of the vapor cycle system is cooled using the fuel flow to the engine. Additionally, a PAO/fuel heat exchanger is utilized to provide backup cooling for the radar avionics if the vapor cycle cooling system fails.

Another approach for providing cooling for an aircraft is disclosed in U.S. Pat. No. 5,414,992 to Glickstein. Glickstein discloses a cooling system wherein bleed air from the compressor of the main engine is expanded through a cooling turbine to provide cold air and shaft power for aircraft components. A heat exchanger cooled by fan air flow diverted from the fan section of the main engine is utilized to precool the bleed air prior to expanding the bleed air across the cooling turbine.

SUMMARY OF THE INVENTION

It is the principal object of the invention to provide a new and improved method and apparatus for cooling the components of a vehicle carrying a combustion engine and a fuel supply for the engine. More specifically, it is an object to provide an efficient cooling system that provides the required cooling functions for a turbofan powered aircraft without draining an unnecessarily high amount of power from the main engine and without occupying an unnecessarily large portion of the aircraft volume.

It is a further object of the invention to provide a cooling system as part of an integrated thermal and energy management system that provides functions of aircraft cooling, environmental control, auxiliary power for ground checkout/maintenance, and emergency power.

It is a further object of the invention to provide a cooling system with fail safe modes of operation so that the system will continue to satisfactorily perform its function even if critical system components should fail.

It is a further object of the invention to provide a cooling system with major components that are treated as line replaceable units that simply plug into and out of the aircraft so that they do not have to be serviced on the airplane.

These and other objects of the present invention are attained in a cooling system that utilizes a cooling device and a recirculating fuel flow. Heat is transferred from the aircraft components to the recirculating fuel flow. The heat is then transferred from the recirculating fuel flow to the cooling device. Finally, the heat is transferred from the cooling device to the engine.

According to one aspect of the invention, a method is provided for cooling components of a vehicle carrying a combustion engine and a fuel supply for the engine. The method includes the steps of flowing fuel from the fuel supply through a first fuel recirculating system, rejecting heat to the fuel from selected components of the vehicle as the fuel flows through the first fuel recirculating system, and rejecting heat to the engine from the fuel as the fuel flow through the first fuel recirculating system. According to another aspect of the invention, the step of rejecting heat to the engine from the fuel further includes the step of rejecting heat from the fuel to a compression/expansion cooling device.

According to another aspect of the invention, the step of rejecting heat to the engine from the fuel includes the steps of flowing a buffer fluid in a recirculating path between the first fuel recirculating system and the engine, rejecting heat to the buffer fluid from the fuel as the fuel flow through the first fuel recirculating system, and rejecting heat to the engine from the buffer fluid as the buffer fluid flows in the recirculating path.

According to yet another aspect of the invention, the method further includes the steps of selectively flowing fuel from the fuel supply through a second recirculating path, transferring heat to the fuel from selected components of the vehicle as the fuel flows through the second recirculating flow path, and cooling the fuel with a compression/expansion cooling device as the fuel flows through the second recirculating flow path.

According to one aspect of the invention, a method is provided for cooling components of a vehicle carrying a fuel supply and a gas turbine engine including an air duct for directing an airstream through the engine. The method includes the steps of flowing fuel from the fuel supply through a fuel recirculating system, rejecting heat to the fuel from selected components of the fuel as the fuel flows through the fuel recirculating system, rejecting heat to an airstream in the air duct from the fuel as the fuel flows through the fuel recirculating system.

According to yet another aspect of the invention, a system is provided for cooling components of a vehicle carrying the system, a fuel tank, and a gas turbine engine including an air duct. The system includes a first recirculating fuel flow path, a first heat exchanger for transferring heat from selected components of the vehicle to fuel flowing through the first flow path, and a cooling device including a second heat exchanger for transferring heat from the fuel to the cooling device as the fuel flows through the first flow path.

DETAILED DESCRIPTION OF THE PREFERRED EMBODIMENTS

Figure 1:
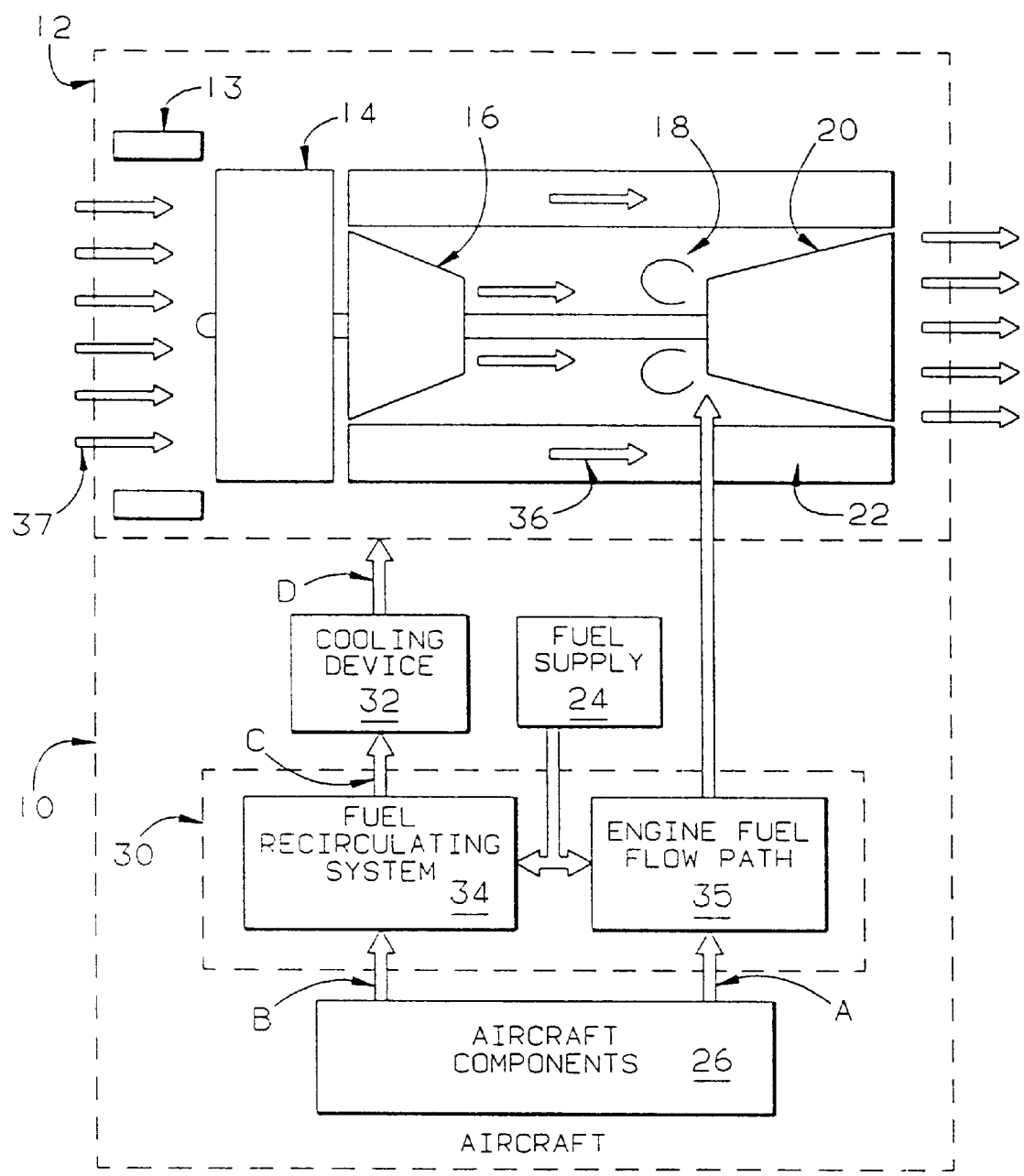
FIG. 1 is a diagrammatic illustration of a cooling system embodying the present invention.
Figure 2:
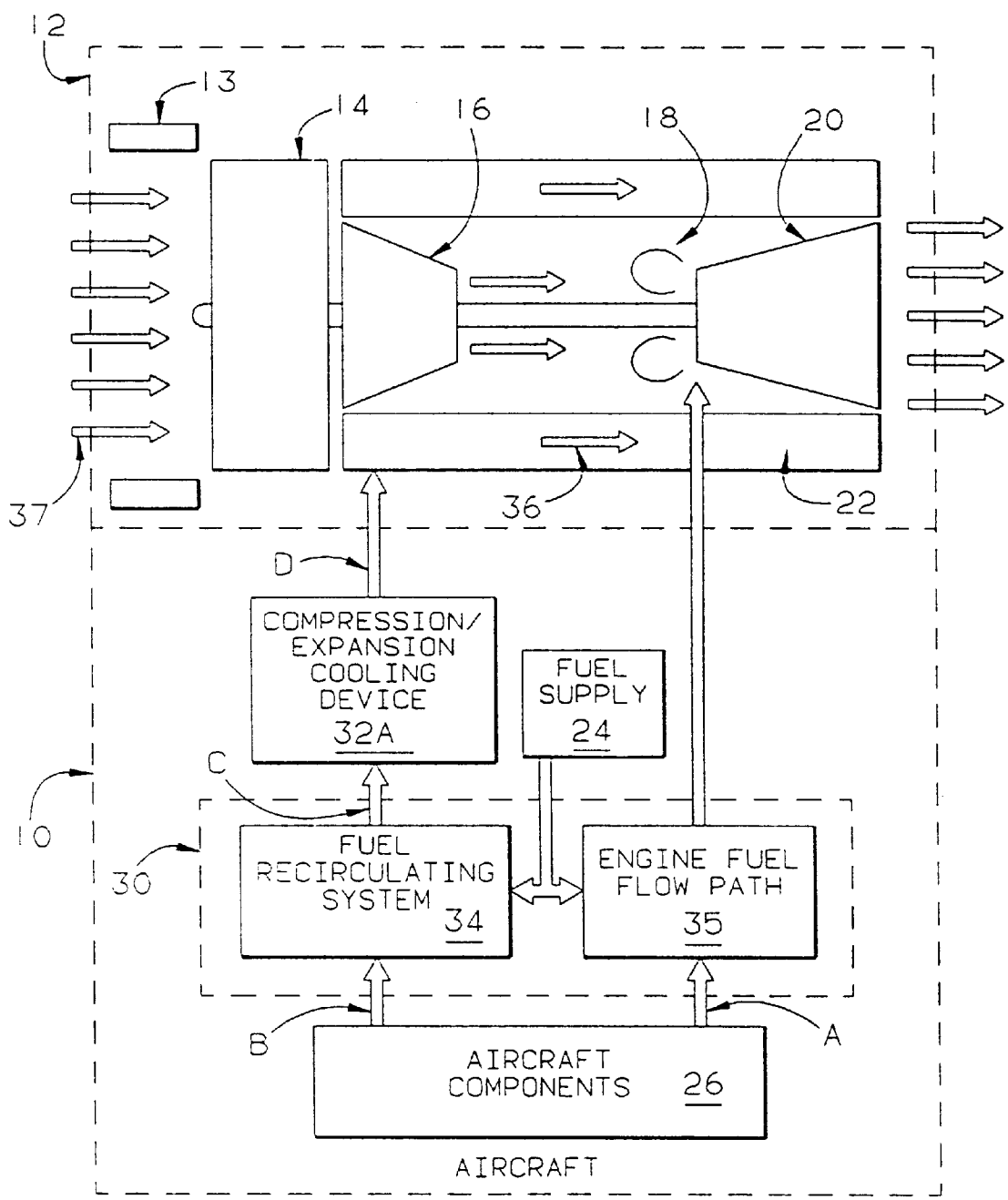
FIG. 2 is a diagrammatic illustration showing one form of the cooling system of FIG. 1.

With reference to FIGS. 1 and 2, exemplary embodiments of a cooling system made according to the invention are described and illustrated in connection with the cooling function of an aircraft utilizing a turbofan main engine. However, it should be understood the invention may find utility in other applications, and that no limitations to use with an aircraft or with a turbofan engine are intended except insofar as expressly stated in the appended claims.

As seen in FIG. 1, the cooling system is incorporated in an aircraft 10 carrying a turbofan engine 12 including an air inlet duct 13, a fan section 14, a compressor section 16, a combustor 18, a turbine section 20, and a fan air bypass duct 22. The aircraft 10 also carries a fuel supply 24 and aircraft components 26 to be described in greater detail hereinafter. The cooling system is carried on the aircraft and includes a fuel-based heat transport system 30 and a cooling device 32. The fuel-based heat transport system 30 includes a fuel recirculating system 34 and an engine fuel flow path 35.

In operation, fuel is supplied from the fuel supply 24 to the fuel recirculating system 34 and to the engine fuel flow path 35. Fuel then passes to the combustor 18 through the fuel flow path 35. It should be appreciated that the fuel recirculating system 34 and the engine fuel flow path 35 may employ common flow conduits where the fuel from both elements 34, 36 is temporarily mixed. Heat from the aircraft components 26 is transferred to the fuel in the engine fuel flow path 35, as indicated by an arrow A. As noted earlier, for many operating conditions in advanced aircraft, the cooling capacity of the fuel flowing through the engine fuel flow path 35 is inadequate to remove all of the heat from the aircraft components 26. Accordingly, the excess heat from the aircraft components 26 is transferred to the fuel flowing in the fuel recirculating system 34, as indicated by an arrow B, and then from the fuel in the fuel recirculating system 34 to the cooling device 32, as indicated by an arrow C. The cooling device 32 transfers excess heat to the engine 12 as indicated by an arrow D.

As best seen in FIG. 2, in one preferred embodiment, the cooling device 32 is provided in the form of a compression/expansion cooling device 32A that transfers excess heat to a fan airstream 36 in the fan air duct 22, as indicated by the arrow D. Under many operating conditions, the temperature of the airstream 36 is higher than the temperature of the fuel in the elements 34 and 35. By utilizing the compression/expansion cooling device 32A, the cooling system is able to transfer heat from the lower temperature fuel in the fuel recirculating system 34 to the higher temperature airstream 36 in the fan air duct 22.

Figure 3:
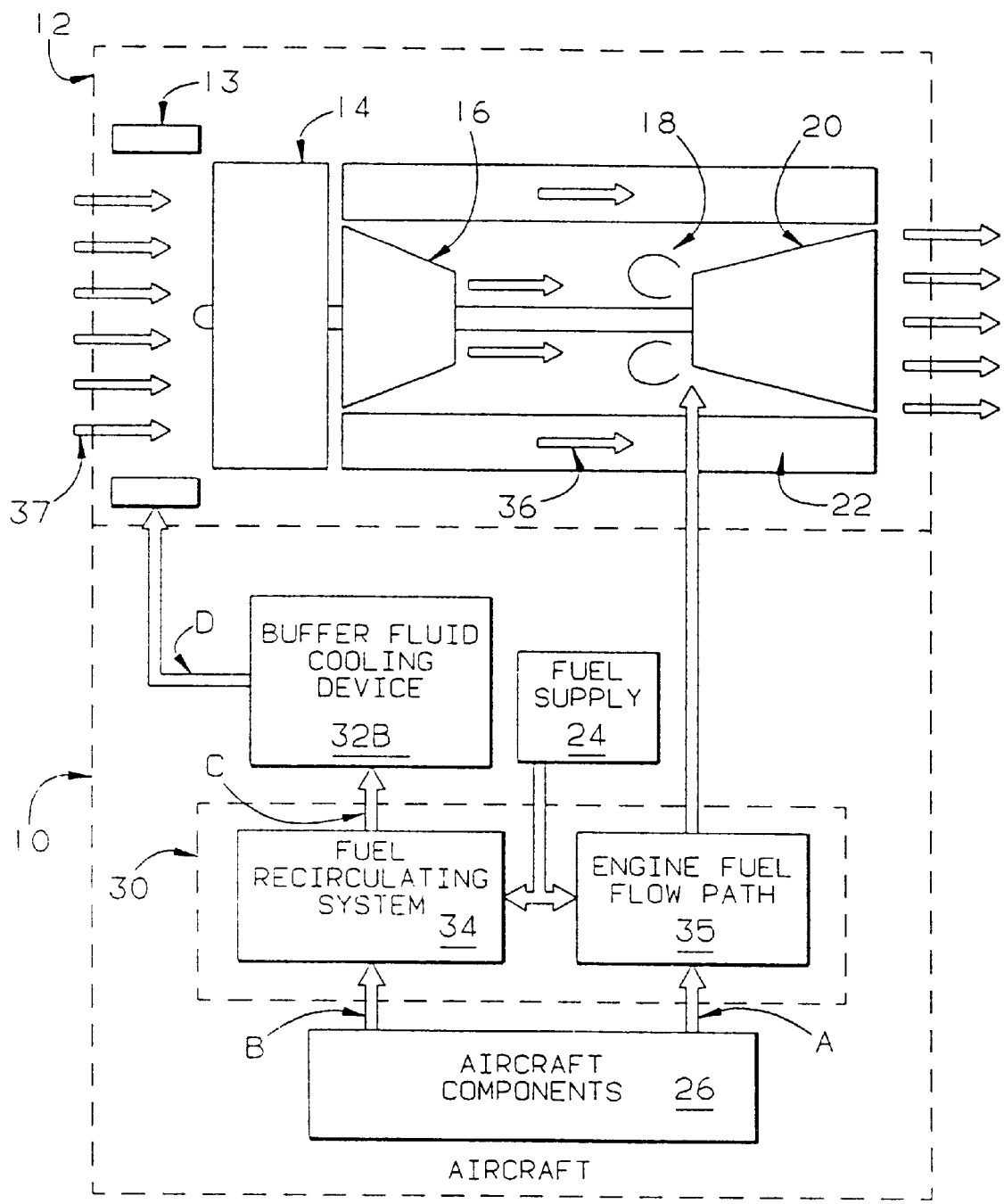
FIG. 3 is a diagrammatic illustration showing another form of the cooling system of FIG. 1.

As best seen in FIG. 3, in another preferred embodiment, the cooling device 32 is provided in the form of a buffer fluid cooling device 32B that transfers excess heat to an inlet airstream 37 in the inlet air duct 13. Unlike the temperature of the fan airstream 36, the temperature of the inlet airstream 37 is lower than the temperature of the fuel in the elements 34 and 35 under most operating conditions. Accordingly, the buffer fluid cooling device 32B is able to transfer heat from the higher temperature fuel in the fuel recirculating system 34 to the lower temperature inlet airstream 37 without using a compression/expansion refrigeration cycle.

Figure 4:
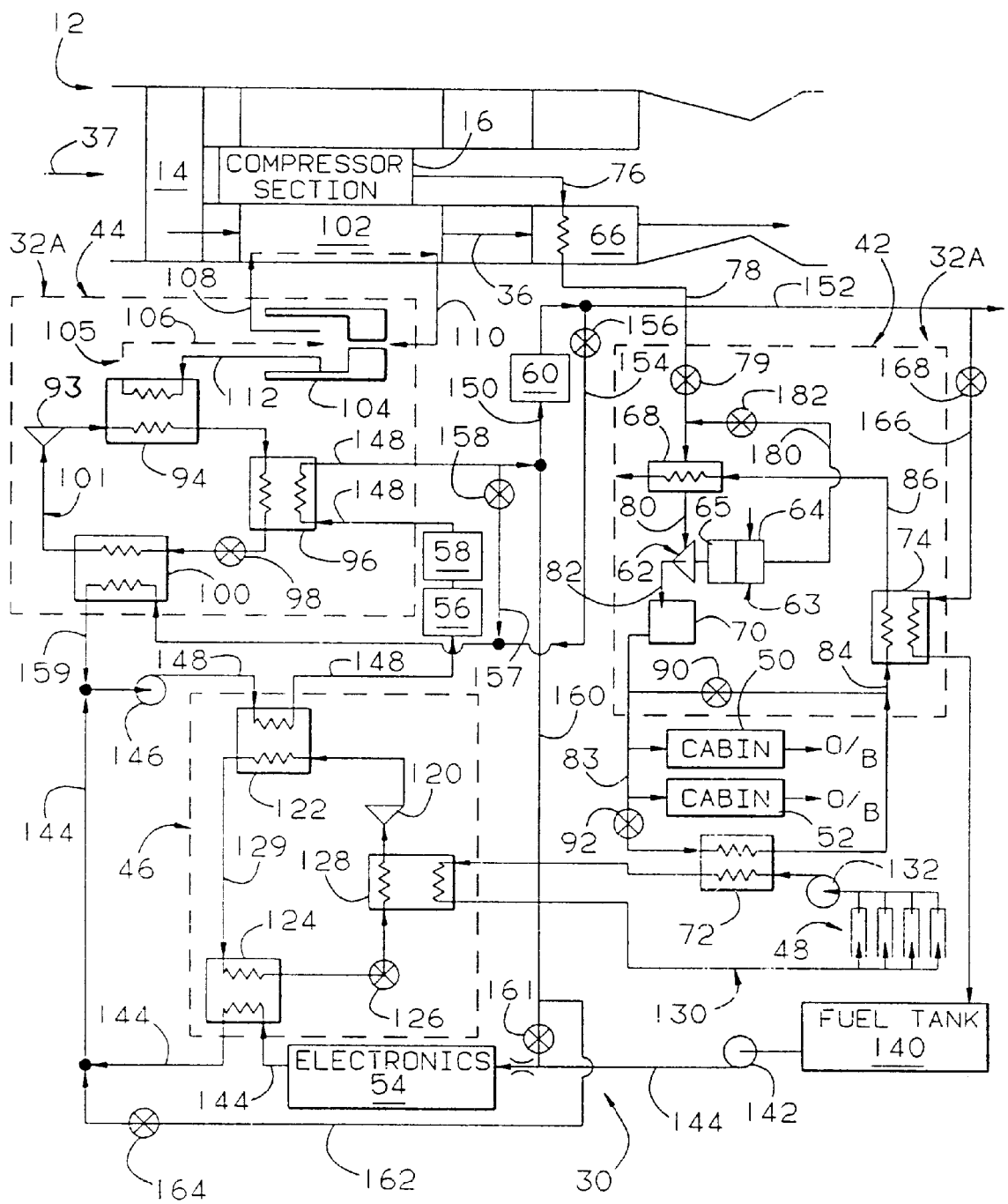
FIG. 4 is a diagrammatic illustration of one form of an integrated thermal and energy management system including a cooling system embodying the present invention.

FIG. 4 shows an exemplary embodiment of an integrated thermal and energy management system that provides the cooling, environmental control, auxiliary power, and emergency power functions for an aircraft 10 carrying a turbofan main engine 12. The thermal and energy management system includes the fuel-based heat transport system, shown generally at 30. and two compression/expansion cooling devices 32A. The first compression/expansion cooling device 32A is provided in the form of a cold air supply 42.

The second compression/expansion cooling device 32A is provided in the form of a high temperature vapor cycle cooling device 44. The thermal and energy management system also includes a low temperature vapor-compression cycle cooling device 46. The system removes heat from the aircraft components 26 which are shown in the form of radar avionics 48, an air-cooled cabin 50, cabin avionics 52, power electronics 54, electric generators 56, hydraulics 58, and engine coolers/fueldraulics 60.

The cold air supply 42 includes a cooling turbine 62 connected to an integrated power unit (IPU) 63 that provides a ground checkout/maintenance function and an emergency power function. The IPU 63 includes a compressor 64 and a power turbine 65 and may be of any known construction, one example of which is disclosed in U.S. Pat. No. 4,819,423 issued Apr. 11, 1989 to Vershure, Jr. et al, the entire disclosure of which is incorporated herein by reference. The cold air supply 42 is connected to a first air/air heat exchanger 66 mounted in the fan air bypass duct 22 to receive air from the compressor section 10, a second air/air heat exchanger 68, a water separator 70, an air/PAO heat exchanger 72, and an air/fuel heat exchanger 74.

In operation, bleed air from the compressor section 16 of the turbofan 12 is directed by an air conduit or line 76 through the heat exchanger 66 where heat from the bleed air is rejected to the fan airstream 36 in the fan air duct 22. The bleed air is then directed to the heat exchanger 68 by an air conduit or line 78. The bleed air entering the cold air supply 42 is regulated by a control valve 79 provided in the line 78. The bleed air is then directed by an air conduit or line 80 to the cooling turbine 62 where it is expanded across the cooling turbine 62 to produce shaft power to drive the IPU 63 and a cool air flow to an air conduit or line 82. The cool air flow is directed via the line 82 to the water separator 70 where condensed water is separated from the air flow. Some portion of the cool air flow is then directed by an air conduit or line 83 to cool the cabin 50 and the cabin avionics 52. After heat from the cabin 50 and cabin avionics 52 is rejected to the cool air flow, the now heated air flow is vented overboard. During normal operation, the remainder of the cool air flow passes through the control valve 90 and is directed by the conduits 84 and 86 through the normally inactive fuel cooling heat exchanger 74 and the normally active bleed air cooling heat exchanger 68. Water that has been separated from the bleed air by the water separator 70 is injected back into the air to evaporatively and sensibly recool the bleed air in the heat exchanger 68. This enhances cooling of the incoming bleed air in the conduit 78. After exiting the heat exchanger 68, the bleed flow may be directed back to the fan air duct 22 for thrust recovery. The heat exchangers 66 and 68 serve to cool the incoming bleed air to the desired turbine inlet conditions and to transfer heat and heated air from the cold air supply 42 to the fan airstream 36 in the fan bypass duct 22.

As will be explained in more detail below, a control valve 92 regulates air flow to the heat exchanger 72, which operates as a fail safe or backup heat exchanger for cooling the radar avionics 48 in the event of a failure of the cooling device 46. Similarly, the heat exchanger 74 acts as a fail safe or backup for removing excess heat from the fuel-based heat transport system 30 in the event of a failure of the cooling device 44. Valve 90 regulates the cooling flow through the heat exchangers 74 and 68 to effect the desired cooling.

The high temperature cooling device 44 includes an electric motor driven compressor 93, a condenser 94, a subcooler 96, an expansion valve 98, an evaporator 100, and a refrigerant flow path 101, as is conventional for vapor-compression refrigeration systems. The cooling device 44 further includes an air/buffer fluid heat exchanger 102 mounted in the bypass duct 22 and a rotary fluid management device (RFMD) 104 for recirculating a buffer fluid such as water between the condenser 94 and the heat exchanger 102 through a flow path 105 including conduits or lines 106, 108, 110, and 112.

Because of the relatively high temperatures in the fuel transport system 30 and the fan airstream 36, the cooling device 44 is intended to operate at relatively high temperatures, with the temperature of the refrigerant flow into the condenser being on the order of 400° F. The preferred refrigerant is reagent grade toluene, which is thermally stable and thermodynamically efficient under such high temperature conditions. FC-75 refrigerant produced by 3M is also an acceptable refrigerant.

Preferably, the buffer fluid in the flow path 105 is water. Water is supplied in liquid form to the condenser 94 by the RFMD 104 and is at least partially vaporized in the condenser 94 as heat is transferred from the refrigerant to the water. The RFMD 104 then separates the vaporized water from the liquid water and delivers the vaporized water to the heat exchanger 102 in the fan air duct 22 where the vaporized water is condensed to liquid water, subcooled slightly and returned to the RFMD 104. In this regard, preferably the heat exchanger 102 is such that condensate is dragged along with the steam flow under all attitude and inertial conditions. The heat exchanger 102 should be designed and/or located so that liquid water drains back to the RFMD 104 when the aircraft is on the ground. Similarly, the condenser 94 should be designed and/or located so that water drains from the condenser 94 back to the RFMD 104 when the aircraft is on the ground. The RFMD is designed to accommodate freezing and thawing of the buffer liquid without being damaged and to thaw relatively quickly. One example of an acceptable RFMD design is disclosed in Kent Weber's copending application Ser. No. 08/823,947, entitled Freeze Tolerant Rotating Fluid Management Device filed Apr. 8, 1997, now U.S. Pat. No. 5,765,628 the entire disclosure of which is incorporated herein by reference.

The low temperature cooling device 46 includes a compressor 120, a fuel cooled condenser 122, a fuel cooled subcooler 124, an expansion valve 126, a refrigerant cooled evaporator 128, and a refrigerant flow path 129. The cooling device 46 is used in connection with a PAO coolant flow loop 130 to cool the radar avionics 48. The flow loop 130 includes a PAO coolant recirculating pump 132 and associated flow conduits or lines for directing the PAO coolant through the radar avionics, the heat exchanger 72, and the evaporator 128. Because it is desirable to keep the radar avionics 48 at a temperature that is lower than the temperature of the fuel under many operating conditions, it is necessary to utilize the cooling device 46 to transfer heat from the relatively cooler radar avionics 48 to the relatively warmer fuel in the heat transport system 30.

The fuel-based heat transport system 30 includes a fuel tank or supply 140, a main fuel pump 142, and fuel conduits or lines 144 for directing fuel to the electronics 54 and through the subcooler 124 to a high flow fuel recirculation pump 146. The heat transport system 30 further includes fuel conduits or lines 148 for directing fuel from the pump 146 through the condenser 122 to the generators 56, and the hydraulics 58, and the subcooler 96. The heat transport system 30 also includes a fuel conduit or line 150 for directing fuel to the engine cooler/fueldraulics 60, a fuel conduit or line 152 for directing fuel to the engine combustors, a fuel conduit or line 154 for recirculating fuel back to the evaporator 100, a control valve 156 for controlling the fuel flow through the line 154, a fuel conduit or line 157 for bypass fuel flow around the engine cooler/fueldraulics 60 to the flow line 154, a control valve 158 for controlling the fuel flow through the line 157, and a fuel conduit or line 159 for directing fuel from the evaporator 100 to the pump 146. Together, the pump 146, the valves 156 and 158, and the lines 148, 150, 154, 157, and 159 define the first fuel recirculating system 34.

The heat transport system 30 further includes a high fuel flow bypass conduit or line 160, a control valve 161 for controlling the fuel flow through the bypass line 160, a high fuel flow temperature control conduit or line 162, a control valve 164 for controlling the flow in line 162, a fail safe fuel flow conduit or line 166 for directing a recirculating fuel flow through the heat exchanger 74 to the fuel tank 140, and a control valve 168 for controlling the fuel flow through the line 166. The flow line 166 and the valve 168 in combination with the remainder of the fuel based heat transport system 30 define the second fuel recirculating system 34.

Preferably, the cold air supply 42, the high temperature cooling device 44 and the low temperature cooling device 46 are provided in the form of line replaceable units that plug into the heat transport system 30, the PAO coolant flow loop 130, the cold air lines 83 and 84, and the buffer fluid flow lines 108 and 110. This provides significant advantage because these devices can be replaced quickly without servicing the devices while physically on the aircraft.

The system has at least six modes of operation as follows:
1) Normal operation
2) High fuel flow operation
3) Excess heat fail safe operation
4) Radar avionics cooling fail safe operation
5) Ground checkout/maintenance operation
6) Emergency power operation During the normal operation mode, cooling for the cabin 50 and the cabin avionics 52 is provided by the cold air supply device 42, as previously explained. In this mode high pressure and temperature bleed air is diverted from the compressor section 16, precooled in the heat exchangers 66, 68 and expanded through the cooling turbine 62. A portion of the cooled bleed air flow is directed to the cabin 50 and the cabin avionics 52. Some of the cooled bleed air flow is always directed via line 86 through the heat exchanger 68 to precool the bleed air flow to the cooling turbine 62. When the pressure level in the bypass air duct 22 is below that of the bleed air flow exiting the heat exchanger 68 via conduit 86, the bleed air flow may be directed to the bypass air duct 22 for thrust recovery. The control valve 79 controls the amount of cooling provided by the cold air supply device 42 by adjusting the amount of bleed air that is allowed to pass through the heat exchangers 66 and 68. The valve 90 controls the cold air flow to the heat exchanger 68 and the amount of precooling provided in the bleed air flow supplied to the cooling turbine 62.

It should be appreciated that during the normal operation mode at high altitude, most of the shaft power produced by the cooling turbine 62 is absorbed by an alternator (not shown) on the IPU 63 and delivered as electrical power to the aircraft's electrical system bus, while a relatively small amount of the shaft power is lost in the "windage" associated with circulating a small amount of air flow through the compressor 64 and turbine 65 of the IPU 64. At low altitude, the "windage" approaches the magnitude of the cooling turbine shaft power output.

During normal operation mode, the PAO coolant flowing in the loop 130 absorbs heat from the radar avionics 48 and rejects the heat to the refrigerant in the low temperature cooling device 46 as it flows through the evaporator 128. The aircraft components 46, 48, 54, 56, 58, and 60 are cooled by the heat transport system 30 and the high temperature cooling device 44 during normal operation mode. In this mode, the main fuel pump 142 pumps a fuel flow equivalent to the immediate fuel flow requirement of the engine 12. This fuel flow absorbs heat from the electronics 54 and the sub-cooler 124 of the low temperature cooling device 46 prior to being mixed with a relatively larger recirculating fuel flow that has been cooled in the evaporator 100 of the high temperature cooling device 44. This mixed fuel flow is then pumped by the recirculation pump 146 through the lines 148 to absorb heat from the condenser 122, the generators 56 and hydraulics 58, and the subcooler 96. After exiting the subcooler 96, the fuel flow splits, with the majority flowing through the line 150 to absorb heat from the engine cooler/fueldraulics 60 and the remainder of the fuel flow recirculating back to the evaporator 100 through the line 157. The fuel flow from the engine cooler/fueldraulics 60 is then split with a portion of the fuel flow equal to the immediate fuel flow requirement for the engine flowing through the line 152 to the engine combustor, and the remainder of the fuel flow being recirculated back to the evaporator 100 through the line 154. The excess heat from the aircraft is transferred in the evaporator 100 from the fuel flow to the refrigerant in the cooling device 44. The excess heat from the aircraft is then transferred in the condenser 94 from the refrigerant to the water in the buffer fluid flow path 105. At least a portion of the water in the flow path 105 is vaporized during this transfer of heat and is subsequently pumped by the RFMD 104 through the heat exchanger 102. The excess heat from the aircraft is then transferred in the heat exchanger 102 from the water to the fan airstream 36. During this transfer of heat, at least a portion of the vaporized water is reformed to liquid in the heat exchanger 102.

It should be appreciated that during this mode of operation the fuel flow to the engine through the line 152 is controlled primarily by the control valve 156. Further, it should be appreciated that the control valve 158 is utilized to provide a cooler fuel flow to the generators 56 and hydraulics 58 by bypassing fuel around the engine cooler/fueldraulics 60. It should also be appreciated that the motor driven compressor 93, the expansion valve 98, and the RFMD 104 may each be used individually or in combination to control the amount of heat ultimately rejected by the high temperature cooling device 44 to the airstream 36.

It should also be appreciated that during the normal mode of operation, the flow lines 148, 150, 154, 157 and 159 act as a first fuel recirculating system 34 and the high temperature cooling device 44 acts as a compression/expansion cooling device 32A that rejects excess heat from the aircraft components 46, 48, 54, 56, 58, 60 to the fan airstream 36 in the fan air bypass duct 22.

Preferably, the most temperature sensitive components are cooled by either the cold air supply 42 or the PAO cooling loop 130 in connection with the low temperature cooling device 46. Further, it is preferred that the least temperature sensitive components are cooled by the recirculating fuel flow from the evaporator 100 of the high temperature cooling device 44.

During the high fuel flow mode of operation, the engine 12 is burning fuel at a very high rate and requires a fuel flow which has more than adequate capacity to absorb all of the heat of the aircraft components 46, 48, 54, 56, 58 and 60. Accordingly during this mode of operation, the control valve 161 bypasses a majority of the fuel flow around the recirculation pump 146 through the flow line 160 to the engine cooler/fueldraulics 60. Further, during this mode of operation, the cooling device 44 may be shut down entirely, run at a moderately low capacity, or run at a very low inlet pressure by overcooling the fuel through the recirculating pump 146 with a relatively cool fuel flow through the line 162. Thus, during this mode of operation, the control valve 156 is essentially closed, with little or no fuel flow from line 152 recirculating through line 154. The fuel temperature level in the flow lines 144, 148, 154, 157, and 159 is controlled by the control valve 164 which allows a relatively cool fuel flow to be directed to the recirculating pump 146 via line 162.

It should be appreciated that, during the high fuel flow operation mode, the temperature of the fan airstream 36 in the fan duct 22 may be so high that the vaporized water from the RFMD 104 does not condense as it flows through the heat exchanger flow 102 because the fan airstream temperature exceeds the saturation temperature of the water. However, no heat is transferred from the fan airstream 36 into the cooling device 44 because the RFMD 104 will only allow liquid water to flow back to the condenser 94 through the line 112. Thus, in this mode, the RFMD 104 and the vaporized water behave as a thermal diode.

It should also be appreciated that water was chosen as the buffer fluid for the buffer fluid flow path 105 because it is universally available, will perform the thermal diode function in connection with the RFMD 104, and is thermally stable at the fan air temperatures (approximately 650° F.) that it may be subject to during some modes of operation, such as a very high speed flight. Further, the use of water reduces any environmental concerns that may arise in connection with a leak of the buffer fluid flow path through the heat exchanger 102. However, it should be understood that any coolant that is thermally stable at the maximum fan airstream temperatures may be used. Further, the thermal diode function is not necessarily required if a sufficient cooling fuel flow is passed through the subcooler 96 and not recirculated through the evaporator 100. In this regard, the heat exchanger 102, the RFMD 104, and the buffer fluid flow path 105 could be eliminated and the condenser 94 could be placed in the fan air duct 22 so that heat is transferred directly from the refrigerant to the fan airstream 36, if the refrigerant does not present an environmental concern and if the cooling device 44 is not designed as a line replaceable unit.

The excess heat fail safe mode of operation is initiated by a failure of the high temperature cooling device 44. During such an event, the valve 168 allows fuel to recirculate back to the fuel tank 140 after passing through the heat exchanger 74. The excess aircraft heat is transferred in the heat exchanger 74 from the recirculating fuel flow to the air flow in the cold air supply 42. In this mode, the control valve 79 increases the cooling capacity of the cold air supply device 42 to absorb the excess heat by increasing the bleed air flow from the compressor section 16 to the cooling turbine 62. The cold air supply 42 continues to provide cooling for the cabin 50 and the cabin avionic 52 in this mode.

It should also be appreciated that during the excess heat fail safe mode of operation, the flow line 166, in combination with the remainder of the heat transport system 30, acts as a second fuel recirculating system 34 and the cold air supply 42, in combination with the compressor section 16, acts as a second compression/expansion cooling device 32A using an air cycle that rejects excess heat from the aircraft components 46, 48, 50, 52, 54, 56, 58, 60 to the fan airstream 36 in the fan air bypass duct 22.

The radar avionics cooling fail safe mode of operation is initiated when the low temperature cooling device 46 fails. In this mode, a cold air flow from the cold air supply 42 is directed by the control valve 92 through the heat exchanger 72. The heat from the radar avionics 48 is transferred in the heat exchanger 72 from the PAO coolant to the cold air flow. The cooling capacity of the cold air supply device 42 is increased to absorb this heat by the control valve 79 which increases the bleed air flow from the compressor section 16 to the cooling turbine 62.

It should be appreciated that the excess heat fail safe mode of operation and the radar avionics cooling fail safe mode of operation may occur simultaneously, with the control valve 79 adjusting the bleed air flow from the compressor section 16 so that the cold air supply 42 has sufficient capacity to cool the aircraft components 46, 48, 50, 52, 54, 56, 58 and 60.

During the ground checkout/maintenance mode of operation, the IPU 63 provides the relatively small amount of electrical power required for ground checkout/maintenance by operating in a gas turbine mode wherein the power turbine 65 is driven by a mixture of fuel and compressed air from the compressor 64 that has been combusted in the IPU combustor (not shown), as is known. Additionally, the compressor 64 of the IPU 63 delivers bleed air to the cooling turbine 62 via a bleed air flow line 180 and a bleed air control valve 182 to provide the air cooling functions. If operation of either of the cooling devices 44, 46 is required in this mode, the fuel pumps 142, 146 and the valve 168 are activated and the heat absorbed by the fuel based heat transport system 30 is transferred from the fuel flow to the cold air flow in the heat exchanger 74.

It should be appreciated that the subcooler 96 is provided primarily for the ground checkout/maintenance of the cooling device 44 and is sufficient to condense the refrigerant in the cooling device 44 up to a reasonable refrigerant flow rate.

During the emergency power mode of operation, the IPU 63 is provided with an air flow from a compressed air storage device (not shown) so that fuel from the fuel tank 140 can be burned in the IPU combustor (not shown) as it operates in its gas turbine mode, as is known. The remainder of the thermal and energy management system, including the cooling turbine 62, operates as it would during the normal mode of operation.

It should be understood that the IPU 63, the electric motor driven compressors 93 and 120, the RFMD 104, the pumps 132, 142 and 146, and the valves 79, 90, 92, 98, 126, 156, 158, 161, 164, and 168 are monitored and controlled using conventional control systems and techniques to achieve the various modes of operations.

Figure 5:
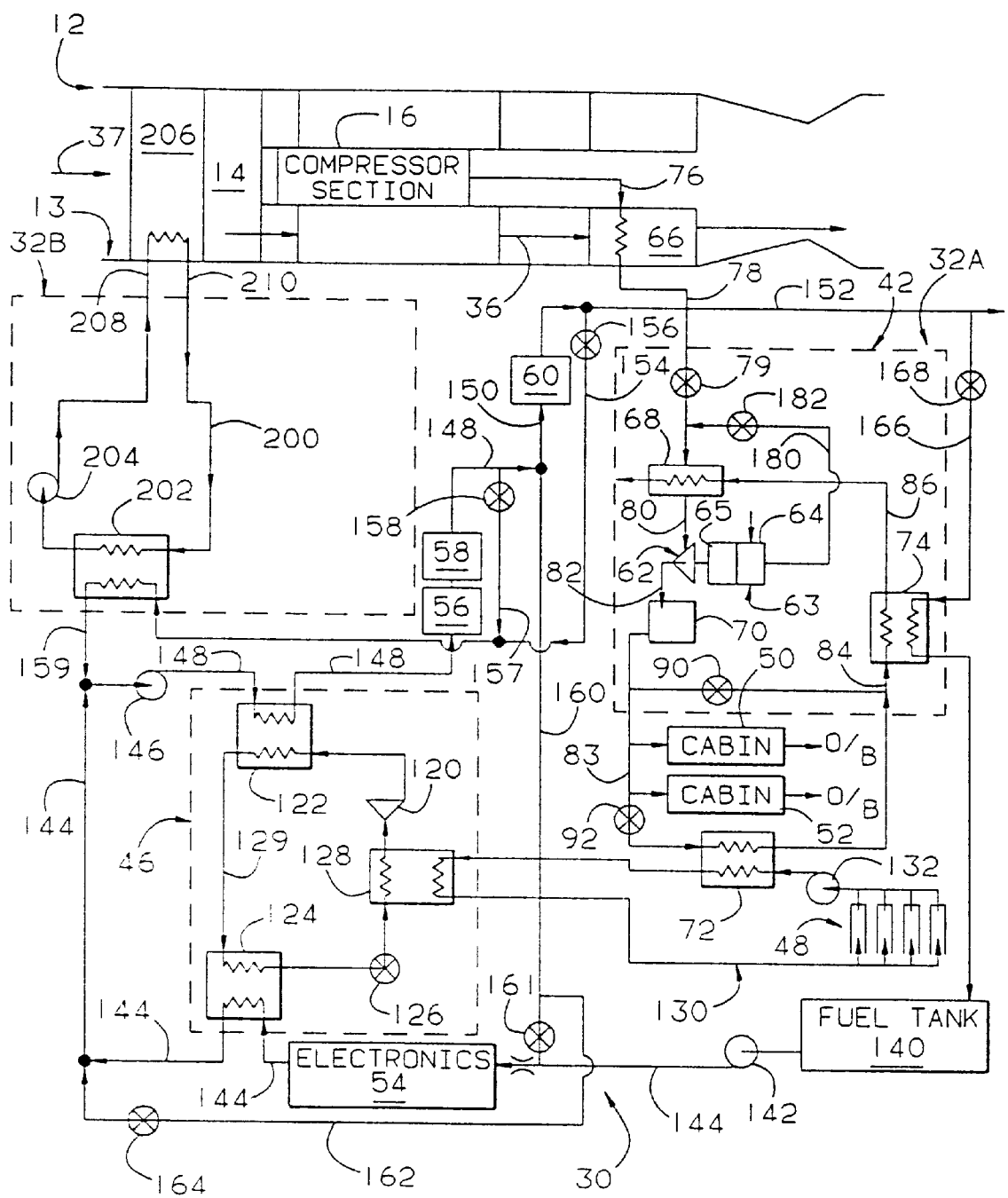
FIG. 5 is a diagrammatic illustration of another form of an integrated thermal and energy management system including a cooling system embodying the present invention.

FIG. 5 shows another exemplary embodiment of the integrated thermal and energy management system that provides the cooling, environmental control, auxiliary power, and emergency power functions for the aircraft 10 carrying the turbo fan main engine 12. This embodiment is exactly the same as the previously described embodiment shown in FIG. 4 with the exception that a buffer fluid cooling device 32B has been substituted for the high temperature cooling device 44. The buffer fluid cooling device 32B includes a recirculating buffer fluid flow path 200 that directs a buffer fluid through a buffer fluid/fuel heat exchanger 202, a buffer fluid recirculating pump 204, and an air/buffer fluid heat exchanger 206 located in the inlet air duct 13. The flow path 200 includes conduits 208 and 210 that connect the remainder of the flow path 200 to the heat exchanger 206. This embodiment of the integrated thermal energy management system operates the same as the embodiment shown in FIG. 4, with the buffer fluid cooling device 32B performing the same functions as the high temperature cooling device 44 for each of the modes of operation. Thus, the excess heat from the aircraft 10 is transferred in the heat exchanger 202 from the fuel flow to the buffer fluid flowing in the flow path 200. The heated buffer fluid is then circulated by the pump 204 to the heat exchanger 206 where the excess heat from the aircraft 10 is rejected from the buffer fluid to the inlet air stream 37.

Preferably, the pump 204 is an electric motor driven pump and the cooling device 32B is provided in the form of a line replaceable unit that plugs into the heat transport system 30 and the flow conduits 208 and 210, with the heat exchanger 206 remaining on the aircraft when the cooling device 32B is removed. This provides significant advantage because the cooling device 32B can be replaced quickly without servicing the device 32B while physically on the aircraft.

The buffer fluid used on the cooling device 32B may be water, PAO, or any other suitable coolant that is thermally stable at the maximum inlet air stream temperatures. It should be appreciated that the buffer fluid cooling device 32B is provided, at least in part, to alleviate concerns associated with flowing fuel directly through a heat exchanger positioned in the inlet air duct 13 of the engine 12. Absent these concerns it is feasible to eliminate the buffer fluid cooling device 32B and route the recirculating fuel flow directly to fuel/air heat exchanger positioned in the air duct 13 to reject heat directly from the fuel flow to the inlet air stream 37.

It should be appreciated that by rejecting the excess heat load from the aircraft to an airstream flowing through the engine, the system is capable of rejecting the excess heat load from the aircraft without requiring an unnecessarily high amount of power from the turbofan in the form of bleed air from the compressor section 16.

In this regard, if heat is rejected to the fan airstream 38 in the fan air duct 22, further advantage is realized from the use of a vapor compression cycle, such as in the high temperature cooling device 44, because of the relatively greater efficiency of a vapor compression cycle in comparison to an air cycle. These advantages result in a significant reduction in gross take off weight in comparison to the TEMM and IPP systems because the disclosed system utilizes far less bleed air during normal operation mode, thereby significantly reducing fuel consumption.

It should also be appreciated that by using a cooling device 32, such as the cooling device 42 or the cooling device 44 or the cooling device 32B, the system removes the excess heat from the aircraft with little or no use of ram air cooling and its associated ducting. Rather, the system utilizes the airstreams 36 and 37 in the air ducts 22 and 13. This has the advantage advantage of eliminating the ducting associated with using RAM air cooling and the additional benefit of converting the excess heat into thrust energy from the turbofan 12.

What is claimed is:

1. A method for cooling components of a vehicle carrying a combustion engine and a fuel supply for the engine, the method comprising the steps of:
   flowing fuel from the fuel supply through a first fuel recirculating system;
   rejecting heat to the fuel from select components of the vehicle as the fuel flows through the first fuel recirculating system; and
   rejecting heat to the engine from the fuel as the fuel flows through the first fuel recirculating system, wherein the step of rejecting heat to the engine from the fuel includes rejecting heat from the fuel to a compression/expansion cooling device as the fuel flows through the first fuel recirculating system.

2. The method of claim 1 wherein the step of rejecting heat to the engine from the fuel includes the steps of:
   flowing a buffer fluid in a recirculating path between the first fuel recirculating system and the engine;
   rejecting heat to the buffer fluid from the fuel as the fuel flows through the first fuel recirculating system; and
   rejecting heat to the engine from the buffer fluid as the buffer fluid flows in the recirculating path.

3. The method of claim 1 wherein the step of rejecting heat to the fuel further includes the steps of:
   rejecting heat from at least some of the select components to an additional compression/expansion cooling device; and
   rejecting heat from the additional compression/expansion cooling device to the fuel as the fuel flows through the first fuel recirculating system.

4. The method of claim 1 further comprising the steps of:
   selectively flowing fuel from the fuel supply through a second fuel recirculating system;
   rejecting heat to the fuel from selected components of the vehicle as the fuel flows through the second fuel recirculating system; and
   cooling the fuel with a compression/expansion cooling device as the fuel flows through the second fuel recirculating system.

5. The method of claim 4 wherein the step of cooling the fuel includes rejecting heat from the fuel to one of a vapor-compression cooling device and an air cycle cooling device.

6. A method for cooling components of a vehicle carrying a combustion engine and a fuel supply for the engine, the method comprising the steps of:
   flowing fuel from the fuel supply through a first fuel recirculating system;
   rejecting heat to the fuel from selected components of the vehicle as the fuel flows through the recirculating system; and
   rejecting heat from the fuel to a compression/expansion cooling device as the fuel flows through the recirculating system, rejecting heat from the compression/expansion cooling device to the engine, without rejecting heat back into the fuel from the compression/expansion cooling device as the fuel flows through the recirculating system.

7. The method of claim 6 wherein the step of rejecting heat from the fuel includes rejecting heat from the fuel to an air cycle cooling device.

8. A system for cooling components of a vehicle carrying a combustion engine and a fuel supply for the engine, the system being carried on the vehicle, the system comprising:
   a first fuel recirculating system;
   first means for rejecting heat from selected components of the vehicle to fuel flowing through the first fuel recirculating system; and
   second means for rejecting heat to the engine from the fuel as the fuel flows through the first fuel recirculating system, wherein the second means comprises a compression/expansion cooling device.

9. The system of claim 8 wherein the second means comprises a buffer fluid flowing in a recirculating path between the first fuel recirculating system and the engine.

10. The system of claim 8 wherein the second means is configured as a line replaceable unit.

11. The system of claim 8 further comprising:
   a second fuel recirculating system;
   third means for selectively flowing fuel from the fuel supply through the second fuel recirculating system; and
   fourth means for cooling the fuel with a compression/expansion cycle as the fuel flows through the second fuel recirculating system.

* * * * *